United States Patent
Nakano et al.

(10) Patent No.: US 11,651,124 B2
(45) Date of Patent: May 16, 2023

(54) ANTI-WARPING DESIGN METHOD FOR RESIN MOLDED ARTICLE, RECORDING MEDIUM, AND ANTI-WARPING DESIGN DEVICE FOR RESIN MOLDED ARTICLE

(71) Applicant: TORAY ENGINEERING CO., LTD., Tokyo (JP)

(72) Inventors: Ryo Nakano, Kyoto (JP); Koshiro Yamakawa, Moriyama (JP); Akira Hyakusai, Omihachiman (JP); Shun Igarashi, Otsu (JP)

(73) Assignee: TORAY ENGINEERING CO., LTD., Tokyo (JP)

( * ) Notice: Subject to any disclaimer, the term of this patent is extended or adjusted under 35 U.S.C. 154(b) by 1107 days.

(21) Appl. No.: 16/292,828

(22) Filed: Mar. 5, 2019

(65) Prior Publication Data
US 2019/0197209 A1  Jun. 27, 2019

Related U.S. Application Data

(63) Continuation of application No. PCT/JP2017/031910, filed on Sep. 5, 2017.

(30) Foreign Application Priority Data

Sep. 6, 2016 (JP) ............................ JP2016-174016

(51) Int. Cl.
*G06F 30/23* (2020.01)
*B29C 45/76* (2006.01)
*G06F 30/20* (2020.01)
*G06F 30/00* (2020.01)
*G06F 113/22* (2020.01)

(52) U.S. Cl.
CPC .............. *G06F 30/23* (2020.01); *B29C 45/76* (2013.01); *G06F 30/00* (2020.01); *G06F 30/20* (2020.01); *G06F 2113/22* (2020.01)

(58) Field of Classification Search
CPC ...................................................... G06F 30/23
USPC ............................................................ 703/6
See application file for complete search history.

(56) References Cited

FOREIGN PATENT DOCUMENTS

| JP | 10-154169 A | 6/1998 |
|---|---|---|
| JP | 2004-148588 A | 5/2004 |
| JP | 2004-268428 A | 9/2004 |
| JP | 2004268428 A * | 9/2004 |
| JP | 2014-228475 A | 12/2014 |

OTHER PUBLICATIONS

Smith, Douglas E.; Tortorelli, Daniel A.; Tucker III, Charles L.; "Optimal design for polymer extrusion. Part I: Sensitivity analysis for nonlinear steady-state systems," Apr. 1998, Elsevier (Year: 1998).*

International Search Report of the corresponding International Application No. PCT/JP2017/031910, dated Oct. 3, 2017.

* cited by examiner

*Primary Examiner* — Eric D Lee
(74) *Attorney, Agent, or Firm* — Global IP Counselors, LLP (57) ABSTRACT

An anti-warping design method for designing a resin molded article on a programmed computer includes dividing the molded article into a plurality of small elements, calculating sensitivity values for at least part of the elements with respect to warpage of the molded article, and displaying a distribution of the sensitivity values.

20 Claims, 5 Drawing Sheets

ANTI-WARPING DESIGN METHOD FOR RESIN MOLDED ARTICLE, RECORDING MEDIUM, AND ANTI-WARPING DESIGN DEVICE FOR RESIN MOLDED ARTICLE

CROSS-REFERENCE TO RELATED APPLICATIONS

This application is a continuation application of PCT International Application No. PCT/JP2017/031910 filed on Sep. 5, 2017, which claims priority to Japanese Patent Application No. 2016-174016 filed on Sep. 6, 2016. The entire disclosures of PCT International Application No. PCT/JP2017/031910 and Japanese Patent Application No. 2016-174016 are hereby incorporated herein by reference.

BACKGROUND

Field of the Invention

The present invention relates to a numerical analysis simulation for a design to prevent warpage of a resin molded article.

Background Information

Injection molding CAE (Computer-Aided Engineering), in which the molding processes in injection molding are reproduced by computer simulation, has been widely put to practical use. In injection molding, a raw material resin (called pellets) is melted in an injection molding machine and injected into a mold under high pressure, and after cooling, the mold is opened and the molded article is taken out. Injection molding CAE is a technique for calculating changes in the pressure, temperature, and density of a resin material in a mold, and analyzing shrinkage and deformation up to when the molded article reaches room temperature and atmospheric pressure after being parted from the mold. Commercial software is marketed and widely used for this technique. By utilizing injection molding CAE, molding defects can be predicted in advance and countermeasures taken, which helps improve quality and efficiency and lower costs in product development.

In injection molding CAE, first a molded article is divided up into elements such as triangles, quadrilaterals, tetrahedrons, or hexahedrons, and the pressure, temperature, flow rate, and so forth of the small elements are calculated by a well-known numerical analysis method such as the finite element method or the difference method, using a basic equation called an energy equation or the mass conservation law and a Navier-Stokes equation, which is well known as a fluid motion equation, or a simplified version thereof. Then, the change in volume of each element is calculated from a state diagram called a PVT diagram, using the history of pressure and temperature of each element, this change in volume is given as the thermal stress load of each element, and the warpage of the entire molded article is found by a well-known numerical analysis method such as the difference method or the finite element method.

When the warpage of the molded article is predicted, measures such as changing a part of the thickness, adding rib reinforcement, changing the molding conditions, changing the position where the material is injected, or the like are added, the simulation is repeated, and molding design and molding conditions that result in less deformation are set by trial and error on a computer. It is standard practice to carry out such warpage simulation.

Also, in Japanese Patent Application Publication No. 2004-268428 (Patent Literature 1) is proposed a method in which the molded article shape is segmented in advance, warpage analysis is performed when attributes such as the thickness of each segment are changed, and the results are compared to the warpage before the change to find the sensitivity of an attribute change with respect to warpage. In Japanese Patent Application Publication No. 2004-148588 (Patent Literature 2) is proposed a method in which, when there are a plurality of runners serving as resin flow paths from the molding machine nozzle to the cavity in an injection molding die, the influence sensitivity of each runner diameter on the pressure is calculated, and the runner diameter is optimized toward improving the pressure balance.

SUMMARY

When the warpage of the molded article is predicted by simulating the warpage of the molded article, measures such as adding ribs are taken, but repeated simulations must be conducted by devising multiple countermeasures until an effective warpage countermeasure is obtained. A typical molded article has a complex shape, the number of elements required for expressing the shape often reaches several million, and the time it takes for one warpage simulation can range from several hours to more than ten hours. For this reason, there is a limit to the number of times trial and error can be performed to examine countermeasures by simulation, and an effective anti-warping measure sometimes cannot be found. In particular, when the examination is performed by inexperienced analysts or non-specialists, it is difficult to come up with a countermeasure from the warpage prediction results, so an efficient warpage reduction technique is needed.

In Patent Literature 1, an attempt is made to improve the efficiency of the repeated calculations by segmenting the shape and changing the attributes, but knowledge about the cause of the warpage is necessary at the segmentation stage, and inappropriate segmentation or specifying the wrong attributes may lead to insufficient warpage reduction. Also, as the number of segments increases, the number of repetitions also increases, resulting in lower efficiency.

Also, as in Patent Literature 2, a method of pre-calculating sensitivity by setting design variables or portions that will become design variables and performing optimization calculation has been realized with optimization software such as "AMDESS for 3D TIMON." Even with this method, though, design variables must be specified in advance, so it is necessary to predict the cause of warpage and to set appropriate variables.

In general, in warpage analysis of injection molded articles, the total shrinkage deformation is calculated as a combination of the shrinkage of individual elements. The present invention makes it possible to prevent warpage most effectively by ascertaining in advance, without any special knowledge, the shrinkage at which sites of a molded article strongly influence warpage, and taking a direct countermeasure at that site.

In order to solve the above problem, an anti-warping design method for designing a resin molded article on a programmed computer is provided that comprises dividing the molded article into a plurality of elements, calculating sensitivity values for at least part of the elements with respect to warpage of the molded article, and displaying a distribution of the sensitivity values.

According to the present invention, it is possible to take measures for effectively suppressing warpage by finding the distribution of the sensitivity that the shrinkage of elements obtained by dividing a resin molded article has on warpage.

DETAILED DESCRIPTION OF EMBODIMENTS

Selected embodiments will now be described with reference to the drawings. It will be apparent to those skilled in the art from this disclosure that the following descriptions of the embodiments are provided for illustration only and not for the purpose of limiting the invention as defined by the appended claims and their equivalents.

Figure 1:
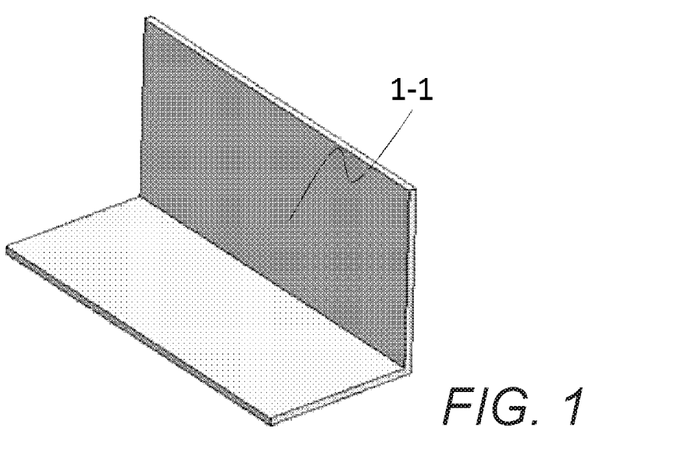
FIG. 1 is a perspective view of an example of an injection molded article.

We will examine reducing warpage in the injection molded article 1-1 shown in FIG. 1.

First, injection molded article shape data is created using three-dimensional CAD (Computer-Aided Design) or the like. This CAD data is made up of information such as the points, straight lines, planes, etc., constituting the shape.

Figure 2:
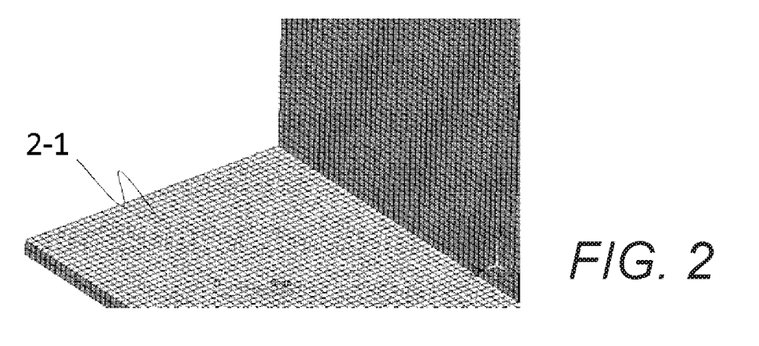
FIG. 2 is an enlarged view of an analysis model of the injection molded article, illustrating the injection molded article being divided into elements.

Next, this CAD data is divided into elements using software called a CAE (Computer-Aided Engineering) preprocessor, and an analysis model is created. FIG. 2 is an enlarged view showing how the analysis model is divided into elements. Commercially available software such as "3D TIMON-Pre," "FEMAP," or "PATRAN" can be used as the CAE preprocessor for creating the elements.

Two-dimensional elements such as triangles or quadrilaterals, or three-dimensional elements such as triangular pyramids, triangular prisms, and hexahedrons are generally used as elements. The vertexes of a element are called nodes, and in FIG. 2, for example, the shape is divided into elements 2-1 that are hexahedrons, with one element being composed of eight nodes.

Figure 3A:
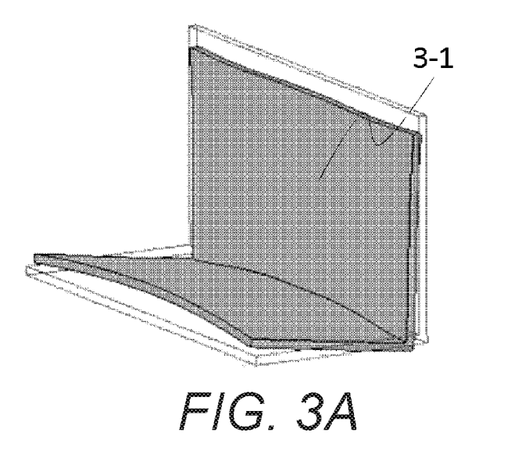
FIGS. 3A, 3B and 3C illustrate warpage analysis results obtained by injection molding CAE.
Figures 3B, 3C:
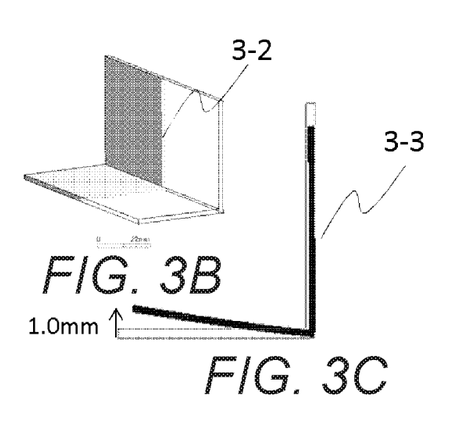

Next, the analysis model and analysis conditions consisting of material property data, boundary conditions, and the like are inputted to the injection molding CAE software, and warpage analysis is performed. Thermophysical properties such as the viscosity and thermal conductivity of the resin, state diagrams, and so forth are inputted as material property data, and the gate position, injection speed, injection temperature, mold temperature, and so forth are inputted as boundary conditions. The history of resin temperature, pressure, speed, etc., during injection molding is calculated by CAE software, and the shrinkage strain of each element is found. This shrinkage strain is imparted to all the elements and heat shrinkage analysis is performed by finite element method or the like to obtain warpage analysis results (called the first warpage analysis result). The results of this warpage analysis are calculated as the amount of displacement of each node, and a warpage diagram having the warpage shape 3-1 as shown in FIG. 3A is obtained. In FIG. 3A, the node displacement amount is uniformly multiplied by 5 in order to make the deformation easier to see. The amount of warpage at the ends of the molded article at the cross-sectional position 3-2 in FIG. 3B was 1.0 mm, for example, as shown in the warped shape 3-3 of the cross section in FIG. 3C.

The influence sensitivity that the shrinkage of each element with respect to warpage is then calculated by sensitivity calculation software. An example of the method for calculating sensitivity is the following direct calculation method.

First, considering only the shrinkage of a first element by considering the shrinkage of other elements as zero, thermal shrinkage analysis is performed just as in the steps of obtaining the first warpage analysis result, and then the warpage analysis results (called the second warpage analysis result) is found.

A node (evaluated node) and a warpage direction for evaluating the warpage is established, and the warpage amount at this evaluated node is obtained from the second warpage analysis result. This is the influence sensitivity exerted by the shrinkage of the first element on the warpage at the evaluated node.

This is repeated for all the elements to find the sensitivity of all elements to the warpage at the evaluated node.

When there are a plurality of evaluated nodes, the sum or average value of the plurality of evaluated node warpage amounts from the second warpage analysis result can be taken as the sensitivity.

In the case of not particularly establishing an evaluation node, the following sensitivity evaluation method is also possible.

A vector V is prepared by arranging the displacement amount data in the X, Y, and Z directions of each node obtained from the first warpage analysis result as shown in Formula (1).

$$V = \{x1, y1, z1, x2, y2, z2, \ldots xn, yn, zn\} \quad (1)$$

The appended numerals in Formula (1) indicate the numbers of nodes. For example, x1 represents the displacement amount in the x direction of a first node. Next, the displacement amount data for each node obtained from the second warpage analysis result due to shrinkage of the first element is termed the vector V'1. As in Formula (2), we will let the inner product of V and V'1 be the sensitivity of the first element with respect to the total warpage (warpage sensitivity (1)). This is repeated for all nodes to obtain a sensitivity distribution.

$$\text{Warpage sensitivity (1)} = V \cdot V'1 \quad (2)$$

If the sites to be examined are limited in advance in finding the sensitivity value by the above-mentioned direct calculation method, it is also effective to find the sensitivity value only for the elements at the positions to be examined. A method based on the adjoint variable method can also be used as another way to find the sensitivity value. With the adjoint variable method, the adjoint equation shown in Formula (3) is solved for λ, and the sensitivity values at all the nodes can be more efficiently found with Formula (4).

$$[K]\{\lambda\} = \left\{\frac{\partial g}{\partial U}\right\} \quad (3)$$

$$\text{Sensitivity Value} = \{\lambda\}^T \left\{\frac{\partial F}{\partial A}\right\} \quad (4)$$

Here, g is a warpage evaluation value, U is a node displacement, [K] is a stiffness matrix, F is a load vector, and A is a design variable.

Figure 4:
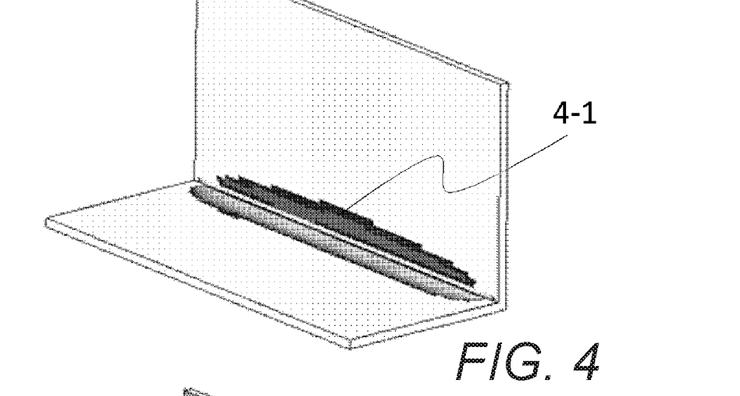
FIG. 4 is a display example showing the distribution of shrinkage sensitivity with respect to warpage of the injection molded article illustrated in FIG. 1.

The warpage sensitivity according to Formula (2) was found for all nodes and given in a contour display, which gave a sensitivity distribution 4-1 for warpage as shown in FIG. 4.

Figure 5:
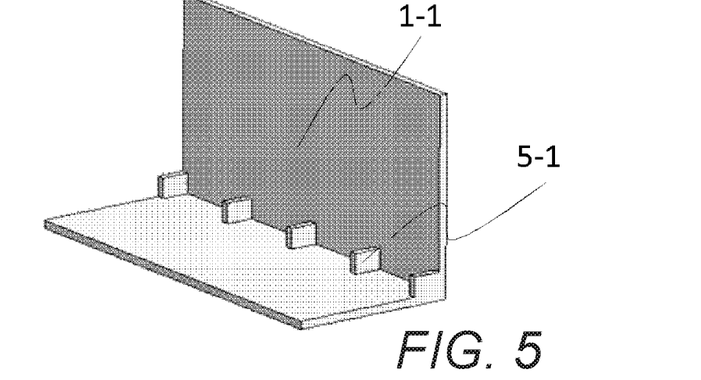
FIG. 5 is a perspective view of an injection molded article with the shape obtained by adding ribs to the injection molded article illustrated in FIG. 1.

In this case, it can be seen that shrinkage of the corner portion strongly influences warpage. In view of this, as shown in FIG. 5, shape correction was performed by providing the injection molded article 1-1 with ribs 5-1 for preventing deformation of the corner portion, and CAD data was reproduced.

Figures 6A, 6B:
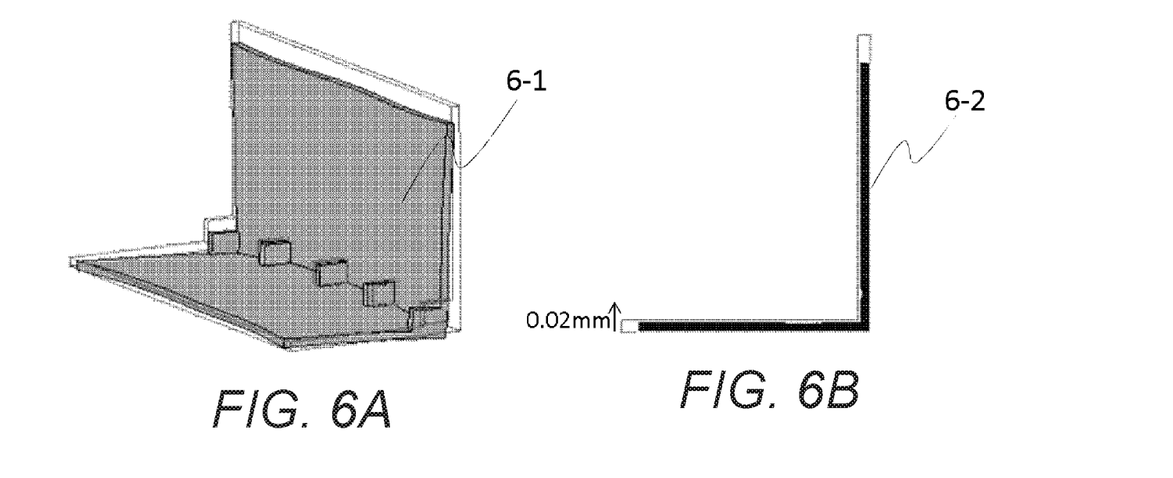
FIGS. 6A and 6B illustrate warpage analysis results obtained by injection molding CAE with respect to the injection molded article with the added rib shape illustrated in FIG. 5.

This CAD data was then used to perform warpage analysis in the same manner as above, which allowed an analysis result such as the warped shape 6-1 shown in FIG. 6A to be obtained, and the warpage was held to just 0.02 mm, in contrast to the 1 mm of the warpage that resulted without the ribs, as seen in the warped shape 6-2 of the cross section in FIG. 6B.

Figures 7A, 7B:
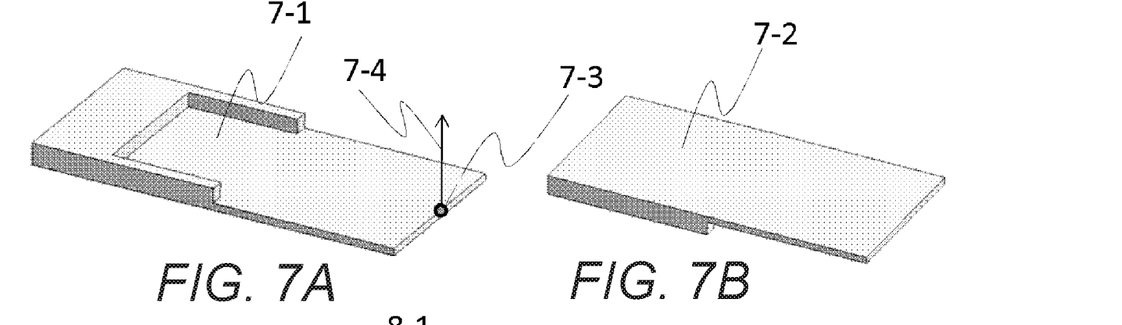
FIGS. 7A and 7B illustrate another example of an injection molded article, FIG. 7A being a front perspective view of the injection molded article, FIG. 7B being a rear perspective view of the injection molded article.
Figure 8:
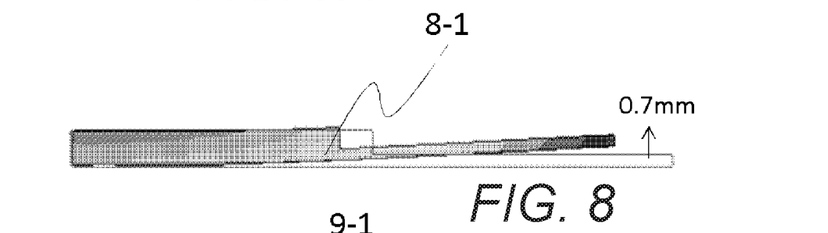
FIG. 8 illustrates warpage analysis results obtained by injection molding CAE with respect to the injection molded article illustrated in FIGS. 7A and 7B.

As another embodiment, warpage analysis was performed on a shape having the front side 7-1 of the injection molded article as shown in FIG. 7A and the back side 7-2 of the injection molded article as shown in FIG. 7B, and the warpage analysis result 8-1 was obtained as shown in FIG. 8. The warpage evaluation node 7-3 and the warpage evaluation direction 7-4 were then established as shown in FIG. 7A, λ was found from Formula (3), the sensitivity values at all nodes were found from Formula (4), and a contour display was made, which gave the sensitivity distribution chart shown in FIG. 9.

Figure 9:
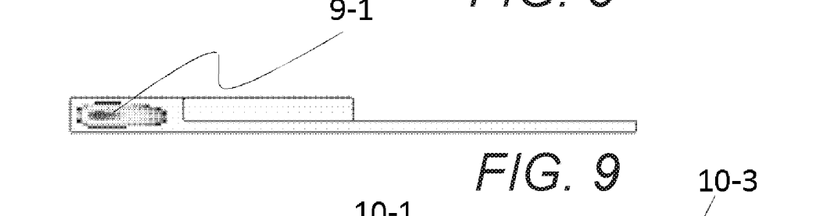
FIG. 9 is a display example showing the distribution of shrinkage sensitivity with respect to warpage of the injection molded article illustrated in FIGS. 7A and 7B.
Figure 10A:
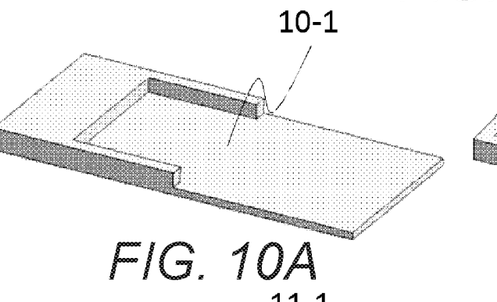
FIGS. 10A and 10B illustrates an injection molded article with the shape obtained by changing a part of the thickness with respect to the injection molded article illustrated in FIGS. 7A and 7B, FIG. 10A being a front perspective view of the injection molded article, FIG. 10B being a rear perspective view of the injection molded article.
Figure 10B:
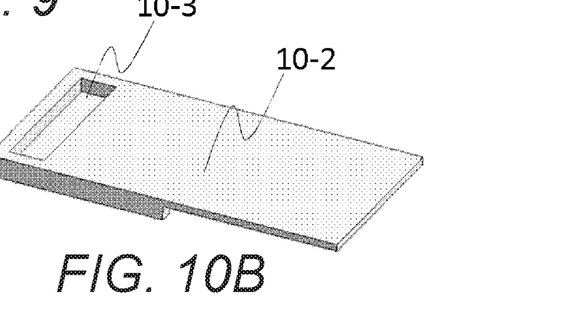
Figure 11:
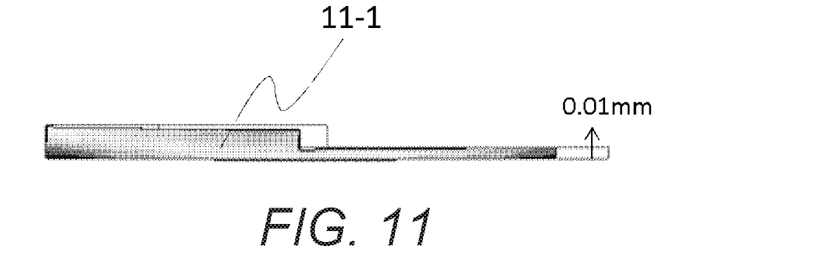
FIG. 11 illustrates warpage analysis results obtained by injection molding CAE with respect to the injection molded article with the shape in which the thickness has been changed illustrated in FIGS. 10A and 10B.

It was revealed that the warpage at the warpage evaluation node 7-3 shown in FIG. 7A is greatly influenced by shrinkage in the region 9-1 shown in FIG. 9, so the shape of the injection molded article was changed to a scooped-out shape in which the front side 10-1 of the injection molded article has the same shape as the front side 7-1 of the injection molded article as shown in FIG. 10A except that there is a thickness changed portion 10-3 on the back side 10-2 of the injection molded article as shown in FIG. 10B, and then the warpage analysis was carried out. As a result, as shown by the warpage analysis result 11-1 in FIG. 11, the amount of warpage at the evaluated position could be reduced from 0.7 mm before the change to 0.01 mm.

Figure 12:
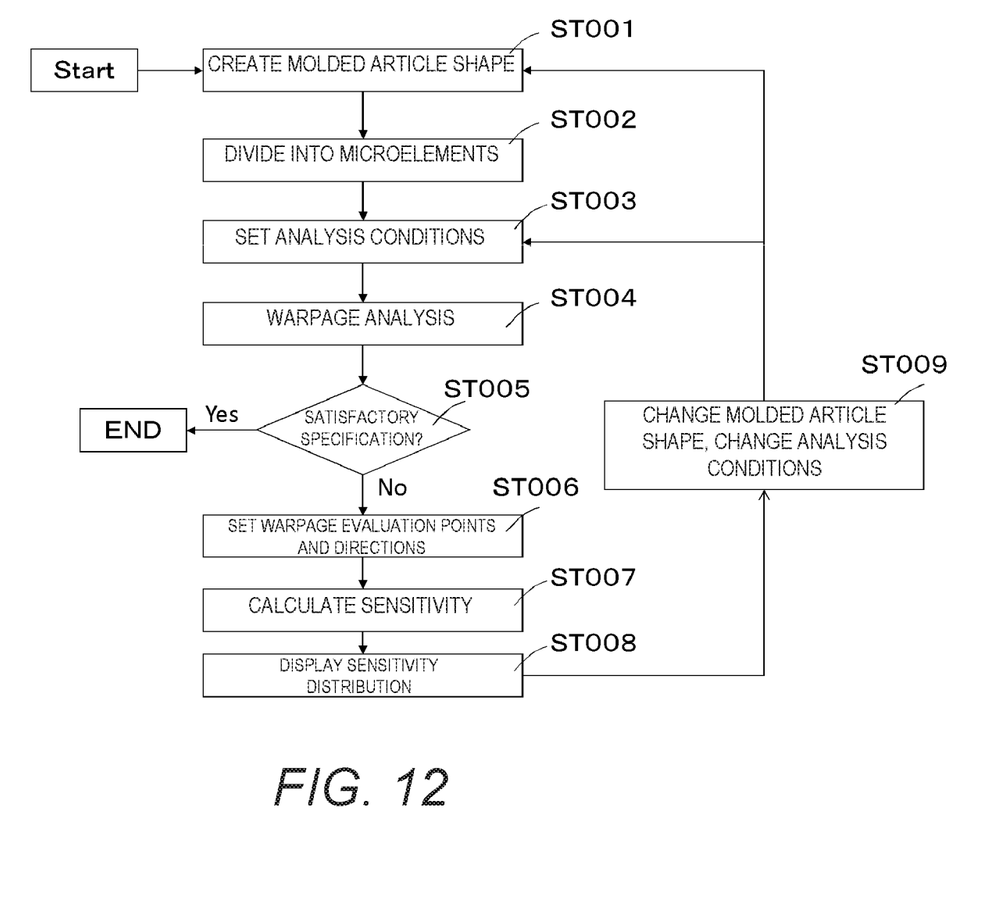
FIG. 12 is a flowchart showing an anti-warping design method in accordance with one embodiment.

FIG. 12 is a flowchart showing the procedure of the anti-warping design method of the present invention. First, the CAD data of the shape of the molded article is created using three-dimensional CAD or the like (step ST001).

Next, the CAE preprocessor is used to divide the CAD data into the elements, and an analysis model is created (step ST002).

Next, the analysis model and analysis conditions composed of material physical property data, boundary conditions, and the like are set and inputted (step ST003), and warpage analysis is performed (step ST004).

Next, the result of the warpage analysis is evaluated (step ST005), and when a satisfactory specification is obtained, the anti-warping design ends here, but if the specification is not satisfactory, then the design is changed by going through the following steps, and analysis is performed again.

First, one or more warpage evaluation nodes and warpage evaluation directions are set (step ST006).

Next, sensitivity calculation is performed on at least part (at least some) of the elements with respect to the set warpage evaluation nodes and warpage evaluation directions (step ST007), and a sensitivity distribution display is performed (step ST008).

Performing this sensitivity distribution display allows the user to see which part of the molded article shrinkage strongly influences the warpage, so the change in the shape of the molded article is appropriately reflected in the 3D CAD data or the analysis conditions (step ST009). As a result of carrying out the warpage analysis again under these new analysis conditions and evaluating the warpage analysis result, if a satisfactory specification is obtained, then the anti-warping design ends here. If a satisfactory specification is not obtained, then the above-mentioned sensitivity distribution display, design change, and reanalysis are performed until a satisfactory specification is obtained.

With the above anti-warping design method, a distribution of the sensitivity that shrinkage of the elements has on the warpage is found prior to changing the molded article shape and repeatedly evaluating it, which allows the user to ascertain, in advance and without any special knowledge, where in the molded article shrinkage greatly influences the warpage, so more effective anti-warping design can be performed.

Similarly, more effective anti-warping design can be performed by using a program that causes a computer to execute this anti-warping design method, a non-transitory computer-readable recording medium to which this program is recorded, or an anti-warping design device for implementing this anti-warping design method.

Figure 13:
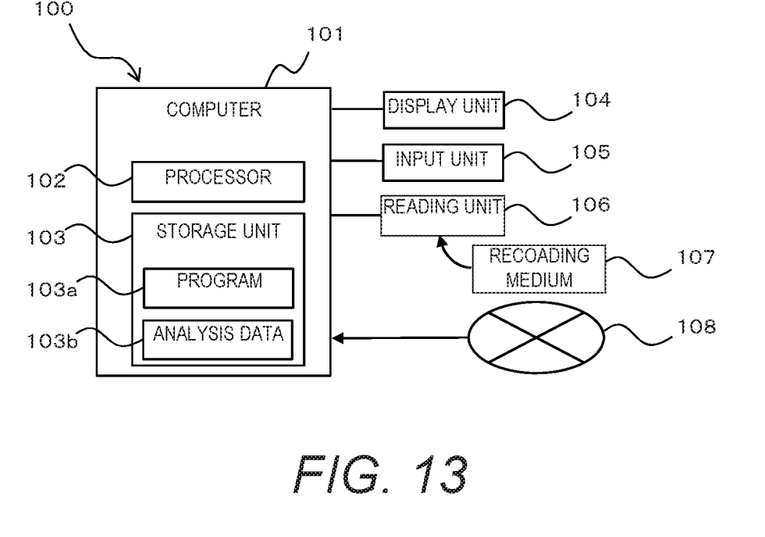
FIG. 13 is a block diagram of an anti-warping design device in accordance with one embodiment.

The anti-warping design method according to the present embodiment can be implemented by causing a computer 101 to execute a program 103a, as shown in FIG. 13. The anti-warping design method can be implemented by, for example, a device configuration as shown in FIG. 13. The computer 101 is configured to execute the program 103a. By causing the computer 101 to execute the program 103a, the anti-warping design device 100 is configured. Part or all of the processing performed by causing the computer 101 to execute the program 103a may be performed by a hardware such as a dedicated arithmetic circuit or the like.

As illustrated in FIG. 13, the computer 101 includes at least one processor 2 having a CPU (Central Processing Unit) and the like, a storage unit 103 (computer memory) having a ROM (Read Only Memory), a RAM (Random Access Memory) 103, a storage device, and the like. The storage device is, for example, a hard disk drive, a semiconductor storage device and the like.

The computer 1 can perform the warpage analysis by causing the processor 102 to execute the program 103a stored in the storage unit 103. In addition to being read from the recording medium 107, the program 103a can be provided from an external server or the like via a transmission path 108 such as a network (the Internet) or a LAN (Local Area Network). The recording medium 107 is an example of a non-transitory computer-readable recording medium, such as an optical disk, a magnetic disk, a nonvolatile semiconductor memory, and stores the program 103a therein.

In addition to the program 103a, various types of analysis data 103b used for performing the warpage analysis are stored in the storage unit 103. The analysis data 103b stored in the storage unit 103 is molded article shape data, boundary condition data, such as the gate position, the injection speed, the injection temperature and the mold temperature, used for analysis, and the like.

Furthermore, as illustrated in FIG. 13, the computer 101 also includes a display unit 104 (display) such as a liquid crystal display device, an input unit 105 having an input device such as a keyboard and a mouse, and a reading unit 106 (reader) for reading the program 103a and various data from the recording medium 107. The reading unit 106 is a reader device or the like corresponding to the type of the recording medium 107. The analysis condition data can be input by the user using the input unit 105. The analysis data 103b may be read out from the recording medium created by the user or may be created by the user on an external server or the like and acquired from the external server via the transmission path 108.

Here, the anti-warping design method for a resin molded article, the program, the recording medium, and the anti-warping design device for a resin molded article of the present invention are not limited to or by the above embodiments, and other modes within the scope of the present invention are also possible. For instance, the present invention can be effectively applied not only to injection molded articles, but also to press molding.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An anti-warping design method for designing a resin molded article on a programmed computer, the method comprising:

dividing a model of the molded article into a plurality of small elements each having nodes which are vertexes thereof;

calculating sensitivity values for at least part of the elements with respect to warpage of the molded article; and displaying a distribution of the sensitivity values, the calculating of the sensitivity values including calculating, for each of the at least part of the elements, sensitivity of influence exerted on warpage at an evaluated position of the modeled article by shrinkage of the element, as the sensitivity value of the element, the sensitivity of influence being warpage amount of a predetermined node of a predetermined element at the evaluated position in a predetermined direction.

2. The anti-warping design method according to claim 1, further comprising inputting the evaluated position and the predetermined direction for evaluating the warpage of the molded article.

3. The anti-warping design method according to claim 2, wherein the calculating of the sensitivity values is performed using an adjoint variable method.

4. A non-transitory computer-readable recording medium storing a program causing a computer to execute the anti-warping design method according to claim 3.

5. An anti-warping design device for a resin molded article, the anti-warping design device comprising:

a processor configured to execute the anti-warping design method according to claim 3.

6. A non-transitory computer-readable recording medium storing a program causing a computer to execute the anti-warping design method according to claim 2.

7. An anti-warping design device for a resin molded article, the anti-warping design device comprising:

a processor configured to execute the anti-warping design method according to claim 2.

8. The anti-warping design method according to claim 1, further comprising analyzing the warpage of the molded article by resin molding CAE (Computer-Aided Engineering).

9. The anti-warping design method according to claim 8, wherein the calculating of the sensitivity values is performed using an adjoint variable method.

10. A non-transitory computer-readable recording medium storing a program causing a computer to execute the anti-warping design method according to claim 9.

11. An anti-warping design device for a resin molded article, the anti-warping design device comprising:
a processor configured to execute the anti-warping design method according to claim 9.

12. A non-transitory computer-readable recording medium storing a program causing a computer to execute the anti-warping design method according to claim 8.

13. An anti-warping design device for a resin molded article, the anti-warping design device comprising:
a processor configured to execute the anti-warping design method according to claim 8.

14. The anti-warping design method according to claim 1, wherein
the calculating of the sensitivity values is performed using an adjoint variable method.

15. A non-transitory computer-readable recording medium storing a program causing a computer to execute the anti-warping design method according to claim 14.

16. An anti-warping design device for a resin molded article, the anti-warping design device comprising:
a processor configured to execute the anti-warping design method according to claim 14.

17. A non-transitory computer-readable recording medium storing a program causing a computer to execute the anti-warping design method according to claim 1.

18. An anti-warping design device for a resin molded article, the anti-warping design device comprising:
a processor configured to execute the anti-warping design method according to claim 1.

19. The anti-warping design method according to claim 1, wherein
the calculating of the sensitivity values includes performing, for each of the at least part of the elements, thermal shrinkage analysis considering only the shrinkage of the element with the shrinkage of other elements at zero.

20. The anti-warping design method according to claim 1, wherein
the calculating of the sensitivity values includes calculating, for each of the at least part of the elements, inner product of a first vector and a second vector,
the first vector being obtained by arranging first displacement amount data in X, Y, and Z directions of each node of the predetermined element at the evaluated position, the first displacement amount data being obtained by performing thermal shrinkage analysis considering all the elements,
the second vector being obtained by arranging second displacement amount data in X, Y, and Z directions of each node of the predetermined element at the evaluated position, the second displacement amount data being obtained by performing the thermal shrinkage analysis considering only the shrinkage of the element with the shrinkage of other elements at zero.

* * * * *